(12) United States Patent
Muller

(10) Patent No.: US 6,795,738 B1
(45) Date of Patent: Sep. 21, 2004

(54) PROGRAMMABLE CONTROLLER

(75) Inventor: Jürgen Muller, Rückersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/402,228

(22) PCT Filed: Mar. 20, 1998

(86) PCT No.: PCT/DE98/00822

§ 371 (c)(1),
(2), (4) Date: Jan. 31, 2000

(87) PCT Pub. No.: WO98/44396

PCT Pub. Date: Oct. 8, 1998

(30) Foreign Application Priority Data

Apr. 2, 1997 (DE) .......................................... 197 13 643

(51) Int. Cl.[7] .............................................. G05B 11/01
(52) U.S. Cl. ........................... 700/14; 700/19; 700/100; 700/306; 703/2
(58) Field of Search ........................... 703/1–2; 700/14, 700/19, 100, 306; 709/100

(56) References Cited

U.S. PATENT DOCUMENTS 5,428,526 A * 6/1995 Flood et al. ................... 700/12
5,619,734 A * 4/1997 Yabusaki ...................... 710/62

FOREIGN PATENT DOCUMENTS

DE 44 10 775 10/1995
EP 0 445 745 9/1992

OTHER PUBLICATIONS

David, "Grafcet: A Powerful Tool for Specification of Logic Controllers," IEEE Transactions on Control Systems Technology, vol. 3 No. 3, pp. 253–268 (Sep. 1995).*

Beestermoeller et al, "Fuzzy–Control With a PEARL–based Multi–Loop Controller," IEEE Seventh Euromicro Workshop on Real–Time Systems, pp. 66–70 (Jun. 1995).*

Beestermoeller et al, "An Online and Offline Programmable Multi–Loop Controller for Distributed Systems," Proceedings of the Third IEEE Conference on Control Applications, vol. 1, pp. 15–20 (Aug. 1994).*

Davis et al, "Recent Advances in the Modeling, Scheduling and Control of Flexible Automation," IEEE Winter Simulation Conference Proceedings, pp. 143–155 (Dec. 1993).*

* cited by examiner

*Primary Examiner*—Samuel Broda
(74) *Attorney, Agent, or Firm*—Staas & Halsey LLP

(57) ABSTRACT

Whenever operating tasks by means of which control functions are implemented, for example, are no longer called by a central task, that is to say the scheduler of a real-time operating system, for example, but instead are called by the respective user-adaptable tasks in which the measured values supplied by the operating tasks are processed, the software producer is relieved of complex organizational work during the production of software. Since the sampling time of, for example, a control algorithm is no longer constant for the resultant calls (which are not equidistant) to the operating tasks, the currently valid sampling time has to be transferred as a parameter to the respective algorithms of the operating tasks. However, the sampling time can be determined in a particularly simple manner if the operating tasks determine a time value with each call and themselves determine the sampling time from the difference between the current and the preceding time value. In turn, it is possible to determine a time value in a particularly simple manner if a time index register is polled for this purpose and is incremented with each call by a time index task which is called periodically by the central task.

13 Claims, 5 Drawing Sheets

PROGRAMMABLE CONTROLLER

FIELD OF THE INVENTION

The present invention relates to a programmable controller for controlling and/or monitoring a technical process, which controller is provided for performing at least one user-adaptable.

Referring to FIG. 6, a programmable controller is, for example, the central processing unit 110 of a programmable logic controller 120 which performs at least one user-adaptable task for controlling and/or monitoring a technical process 130 which is to be automated.

BACKGROUND INFORMATION

It is frequently possible to perform control functions in order to control and/or monitor a technical process. Such control functions are available to the user of the programmable controller in a library, for example. Simple control functions are, for example, control functions using the so-called P algorithm, in which the control function emulates a control unit with a proportional character, using the so-called PI algorithm, in which the control function emulates a control unit with a proportional/integral character, or using the so-called PID algorithm, in which the control function emulates a control unit with a proportional/integral/differential character.

Such control functions are in general use, so that they are frequently available in the form of libraries. The user uses the control function and specifies only the parameters, for example the proportionality factor or the lead time, depending on the application.

A control unit produced in this manner in a programmable controller is always a sampling control unit operating in discrete time. The respective control algorithm is geared to this fact. A sampling control unit is operated in a fixed sampling interval, the control unit being activated at the sampling instants in each case. In the case of a sampling control unit produced on a software basis, the control algorithm is activated, i.e., called, at the respective sampling instants.

For this purpose, the control algorithms may be held available in a library in the form of program sections or subroutines which can be called separately, or they may be programmed by the user depending on current requirements. The individual algorithm is then available to the overall program as a subroutine which can be called separately, and is integrated into the overall program as a module. Such a module which can be called separately and implements a specifiable functionality is also called an operating task in the following text.

In process control devices of the type described above, a central task is usually provided which guarantees that the control algorithms described above, for example, are called periodically by executing corresponding control statements. In this way, for example, it is possible, depending on the computational power of the process control device, for a specific control algorithm to be called periodically with a clock cycle of 200 ms. This cycle time corresponds to the sampling time and is entered as a parameter in the respective control algorithm.

When producing user programs for control purposes in programmable controllers, the use of, for example, the control functions described above, and alternatively the use of filters, set-point encoders, integrators, differentiators etc., requires these to be called in a defined time sequence.

In order to implement this call concept, it is frequently necessary to program a timing manager in order to utilize the cycle time of the controller uniformly. In addition to considerable effort in terms of working time, this also means that the user, the software producer, must specify the sampling times for each operating task, that the user must transfer the sampling time to each periodic operating task of the type described above since this sampling time is included as a parameter in the respective calculations, and that, in addition, the user must concern himself or herself with the timing management for each program.

This requires the user to have a good understanding of control engineering which is often lacking in traditional controller construction or in any case entails unnecessary programming and commissioning effort, particularly with slow procedures such as temperature control.

In addition, there is the risk that incorrect timing management will cause the programmable controller to enter an error state, which can still occur even after commissioning since superimposed asynchronous procedures with cycle time loads which are not negligible are involved, and these cycle time loads are very difficult to calculate without in-depth knowledge.

SUMMARY

An object of the present invention is to provide a programmable controller in which one or more operating tasks can be called in the periodic part of the user-adaptable task, and the sampling time which is necessary for calculating the mathematical or logic function on which the algorithm of the respective operating task is based can be determined in each individual operating task and is therefore available as a parameter for the logic function.

This object is achieved by providing a programmable controller for controlling and/or monitoring a technical process, which controller is provided for performing at least one user-adaptable task, in particular a central processing unit of a programmable logic controller. The user-adaptable task is capable of calling at least one operating task.

The operating task receives at least one measured value from the technical process and determines at least one piece of data, referring to a measured value, on the basis of a specifiable mathematical or logic function defined by at least one parameter. The piece of data may be determined, referring to a measured value, when the operating task is called. The operating task determines the instant of the call. A time difference may be determined between the current call and a preceding call, the time difference being a parameter of the mathematical or logic function.

If the time difference between the current call and a preceding call can be determined by the operating task itself, it is not necessary to transfer this time difference to the operating task as a parameter. This reduces the computation time of the programmable controller and, in particular, relieves the load on the stack in which the data are temporarily stored during parameter transfer.

In programmable controllers which perform at least one user-adaptable task in order to control and/or monitor a technical process, so-called real-time execution is normally provided, that is to say that, within certain limits, the operating system or a task on which the user-adaptable task is superimposed ensures that actions are initiated at precise, specifiable instants. In the present case, the task which is called the central task in the following text is, for example, the task described above on which the user-adaptable task is superimposed, or a task which is called by the specific operating system.

If the user-adaptable task can be controlled by this central task, it is possible, for example, to call the user-adaptable task periodically within fixed time intervals. If the operating tasks described above are called from a user-adaptable task which is controlled in this way, the defined call frame of the user-adaptable task also guarantees a call frame, defined within certain limits, for the operating task, with the result that this roughly establishes the relationships again which already exist when the operating task is called by the central task according to the prior art, but with a significant reduction in programming and planning effort as well as a reduction in the amount of computation time for the programmable controller.

If at least one time index task is provided in addition to the user-adaptable task, it being possible for the time index task to be called by the central task, and the time index task incrementing the contents of a time index register with each call, the contents of the time index register can be used to make a common time base available for all operating tasks.

The time index task is called by the central task at specifiable instants, the time index task incrementing at least the contents of one time index register with each call. The call instants of the time index task depend on the smallest so-called section time constant of the technical process to be controlled and/or monitored. The interval between two call instants of the time index task is therefore usually chosen to be smaller than the smallest section time constant of the technical process.

The interval between two call instants of the time index task must, in turn, be chosen to be of such a size that the time period between a first overflow of the time index register and a second overflow of the time index register is greater, in particular significantly greater, than the largest section time constant detected.

If the time index task increments the contents of the time index register with each call, a sawtooth function is produced if the contents of the time index register are plotted against time, since the register contents become zero immediately after a register overflow and, consequently, are subsequently incremented starting from zero again. The time index register is a so-called global register, so that the contents of the time index register can be determined both by the overall program as well as by all the subroutines, in particular by the operating tasks which are performed by the programmable controller.

If the time index task can be called by the central task in a specifiable, equidistant time frame, the contents of the time index register cause a linear time base to be produced for the overall program, the subroutines which can be called and the operating tasks in particular.

If, in order to determine its call instant, the operating task determines the contents of the time index register, it is particularly simple to determine the call instant additionally referring, as described above, to the common time base of the overall program, the subroutines which can be called and the operating task in particular.

Another object of the present invention is to provide a method for calling an operating task in a programmable controller, in particular a central processing unit of a programmable logic controller for controlling and/or monitoring a technical process, which controller is provided for performing at least one user-adaptable task, by means of which process the operating tasks are called in the periodic part of the user-adaptable task and in which process the sampling time required for calculating the mathematical or logic function on which the algorithm of the respective operating task is based is determined in each individual operating task and is therefore available as a parameter for the logic function.

This object is achieved by providing a method for calling an operating task in a programmable controller, in particular a central processing unit of a programmable logic controller, for controlling and/or monitoring a technical process, which controller is provided for performing at least one user-adaptable task. The object is achieved by providing a method in which object being achieved by virtue of the fact the operating task is called by a user-adaptable task. The operating task receives at least one measured value from the technical process and determines at least one piece of data, referring to a measured value, on the basis of a specifiable mathematical or logic function defined by at least one parameter. The piece of data referring to the measured value is determined when the operating task is called. The operating task determines the instant of the call. A time difference is determined between the current call and a preceding call. The time difference is a parameter of the mathematical or logic function.

BRIEF DESCRIPTION OF THE DRAWINGS

Further advantages and inventive details become apparent on the basis for the figures in conjunction with the subclaims. Specifically.

DETAILED DESCRIPTION

Figure 1:
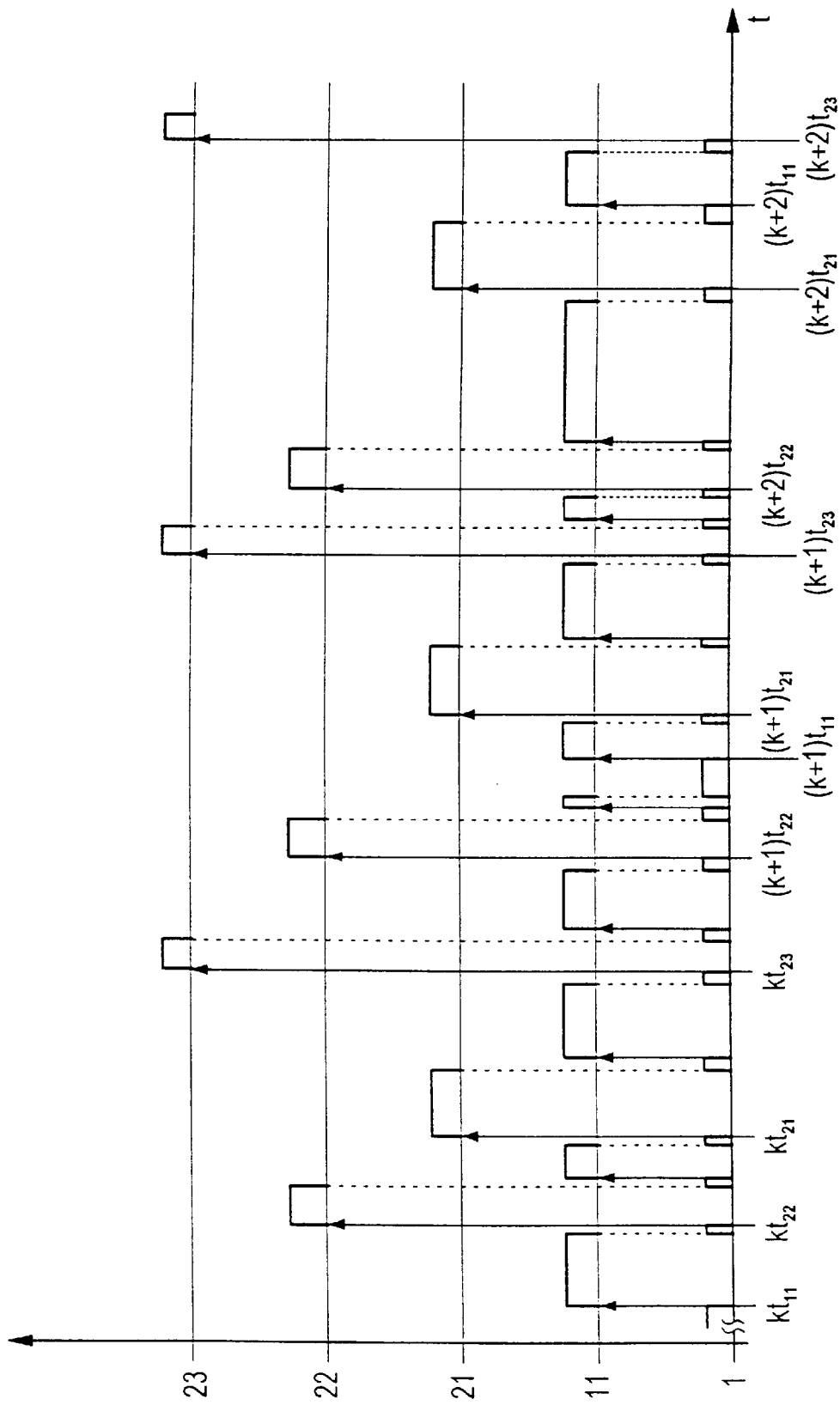
FIGS. 1 and 3 show a timing diagram.

FIG. 1 shows a timing diagram for a user-adaptable task 11 which is called by a central task 1, the central task 1 additionally calling the operating task 21, 22 and 23 at specifiable instants and, for this purpose, interrupting the execution of the user-adaptable task 11.

As shown in FIG. 1, the user-adaptable task 11 is called by the central task 1 at instant $kt_{11}$. At instant $kt_{21}$, the central task 1 interrupts the user-adaptable task 11 in order to call the operating task 22. After the operating task 22 has been finished, control is handed back briefly to the central task 1, which determines, on the basis of the data and parameters available to it, that the user-adaptable task 1 is still capable of running, and, accordingly, reactivates the user-adaptable task 11.

At instant $kt_{21}$, the user-adaptable task 11 is again interrupted by the central task 1 in order to enable the operating task 21 to be performed. After the operating task 21 has been finished, control is again briefly handed back to the central task 1, which, in turn, establishes that the user-adaptable task 11 is still capable of running, and, accordingly, reactivates the user-adaptable task 11.

At instant $kt_{e3}$, the central task 1 interrupts the user-adaptable task 11 once again in order to call the operating task 23. After the operating task 23 has been finished, control is briefly returned to the central task 1 again, the latter determining that the user-adaptable task 11 is still capable of running, and therefore reactivating the user-adaptable task 11 accordingly.

At instant $(k+1)t_{22}$, the user-adaptable task 11 is again interrupted by the central task 1 in order to call the operating task 22 again. After the renewed performance of the operating task 22 has finished, the central task 1 again briefly hands over control to the user-adaptable task 11, which is still always capable of running.

After the user-adaptable task 11 has been finished, control is returned to the central task 1, which restarts the user-adaptable task 11 at instant $(k+1)t_{11}$.

At instant $(k+1)t_{22}$, the central task 1 interrupts the renewed performance of the user-adaptable task 11 in order to restart the operating task 21. After the operating task 21 has been finished, the central task 1 reactivates the interrupted user-adaptable task 11 again. In the case of the call process known in the prior art, this system means that, in order to perform operating tasks 21, 22, 23, a user-adaptable task 11 is interrupted at each of the instants $(k+x)t_{21}$, $(k+x)t_{22}$, $(k+x)t_{23}$ at which they are performed.

The important thing is to establish that the operating tasks 21, 22, 23 are performed asynchronously to the performance of the user-adaptable task 11. This is because of the fact that all tasks, that is to say both the user-adaptable task 11 and the operating task 21, 22, 23, are called by the central task 1.

Figure 2:
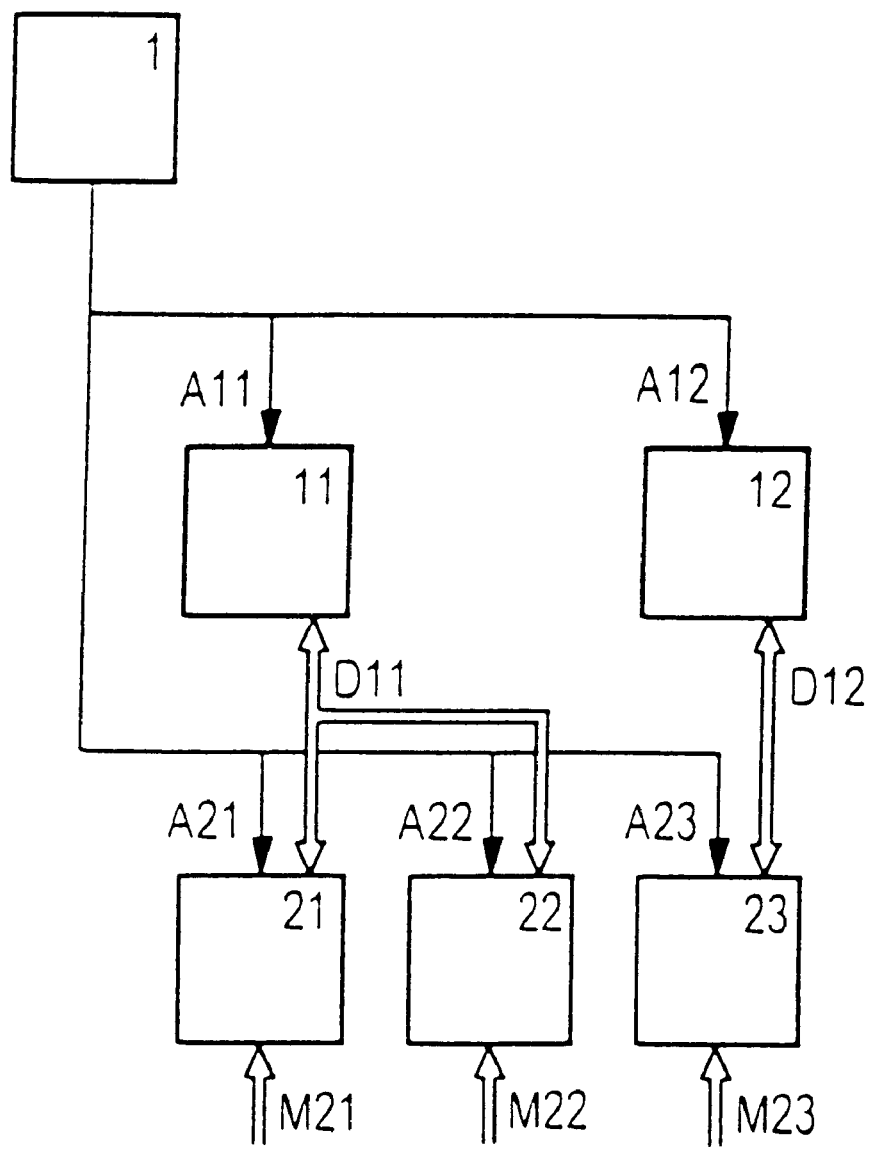
FIGS. 2 and 4 show a call hierarchy.

This interdependence is illustrated by FIG. 2 once more by way of example. The central task 1 calls the user-adaptable tasks 11 and 12 at specifiable instants $(k+x)t_{11}$ and $(k+x)t_{12}$, respectively. Independently of these user-adaptable tasks 11, 12 being called, the central task 1 also controls the calling of the operating tasks 21, 22, 23 at the respective call instants $(k+x)t_{21}$, $(k+x)t_{22}$ and $(k+x)t_{23}$, respectively.

Figure 3:
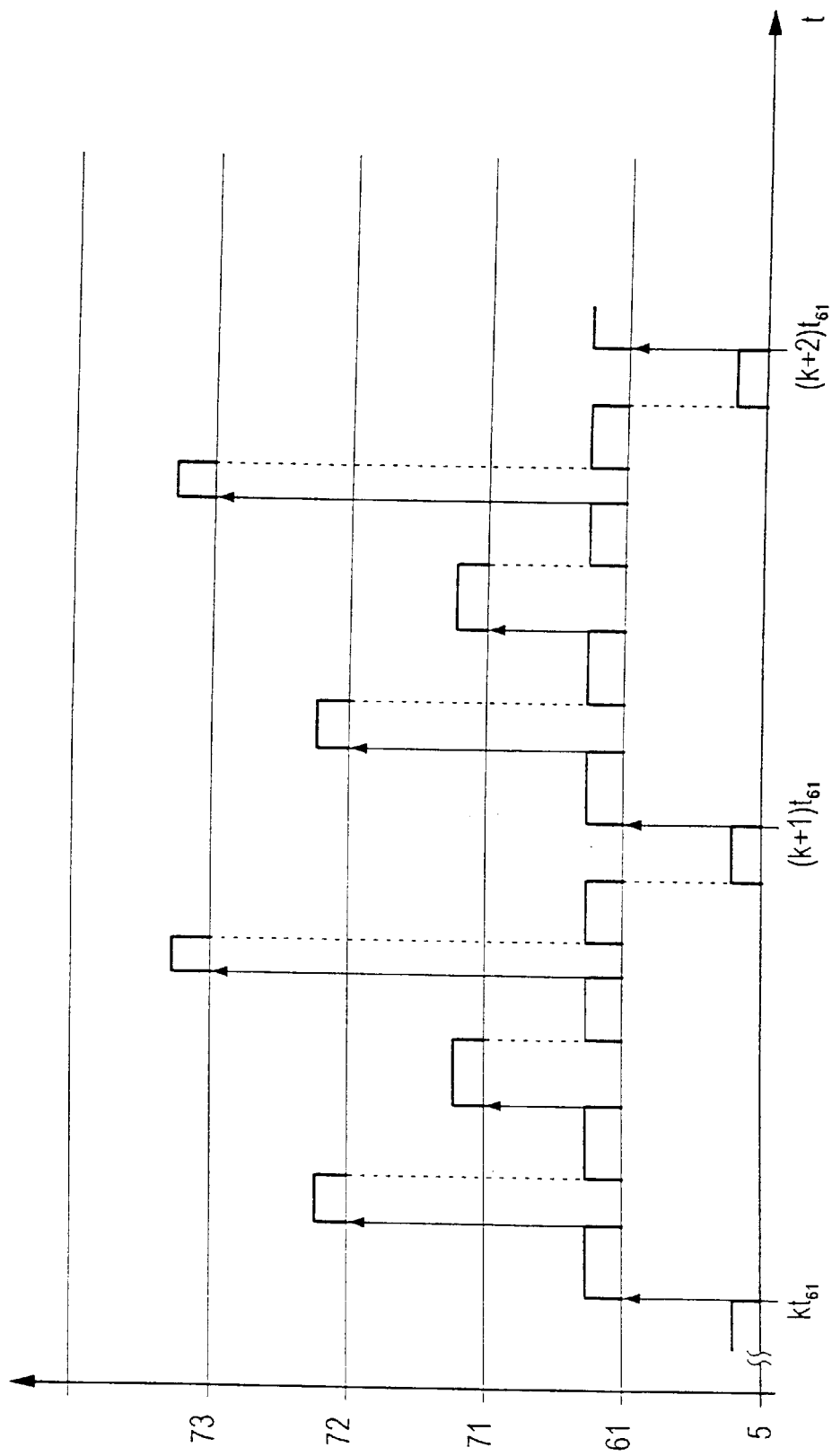

In contrast, the present invention provides that the operating tasks 71, 72, 73 are called by the user-adaptable task 61. The resulting relationships are illustrated in a timing diagram in FIG. 3.

The central task 5 calls the user-adaptable task at call instant $kt_{61}$. The operating tasks 71, 72, 73 are immediately called from the user-adaptable task c1. The call instants $(k+x)t_{71}$, $(k+x)t_{72}$, $(k+x)t_{73}$ thus arise from the position of the respective call statements within the control statements of the user-adaptable task 61. It is thus possible, therefore, to call the operating tasks 71, 72, 73 within the user-adaptable task at precisely the point at which the piece of data D71, D72, D73, which refers to a measured value and is supplied by the respective operating tasks 71, 72, 73, is required immediately.

Figure 4:
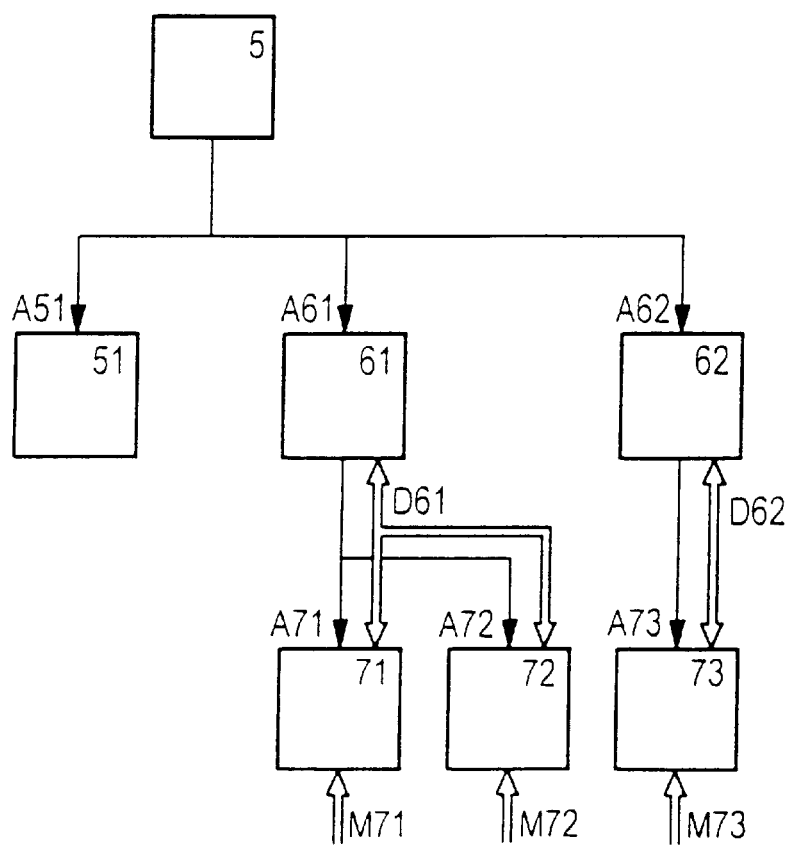

The easier call conditions which result from this are illustrated once more in FIG. 4. The central task 5 calls the user-adaptable tasks 61, 62 at the respective call instants $(k+x)t_{61}$ and $(k+x)t_{62}$. Call instructions, which call the operating tasks 71, 72, 73, are now located within the control statements of these operating tasks. By way of example, FIG. 4 illustrates the case in which the user-adaptable task 61 calls the operating task 71 and 72, and, on the other hand, the user-adaptable task 62 calls the operating task 73. Of course, it is possible to have configurations which differ from the illustrative example.

Whereas, in the timing diagram according to FIG. 1, the interval between the respective calling of an operating task 21, 22, 23 always remains the same, and consequently the operating tasks 21, 22, 23 are always called at equidistant time intervals, this cannot be guaranteed for calling the operating tasks 71, 72, 73 in accordance with the present invention.

As described, the operating task 71, 72, 73 is called according to the present invention by means of a corresponding statement from the respective user-adaptable task 61, 62. This means that the call instants of the operating task 71, 72, 73 depend on the computation time required to process and execute the control statements contained in the user-adaptable task 61, 62.

If, for example, an iteration with a variable iteration depth is carried out before the operating task 73 is called by the user-adaptable task 61, the iteration depth may be less when the user-adaptable task 61 is first called than when the user-adaptable task 61 is called a second time, and consequently the call instant of the operating task 72 may therefore also be shifted backwards, when the user-adaptable task 61 is called a second time, by virtue of the computation time being increased on account of the increased iteration depth.

When a call is made according to the present invention, the respective operating tasks 71, 72, 73 are therefore not called at equidistant time intervals. If the operating tasks 71, 72, 73, as described above, carry out a control algorithm, into which measured values M71, M72, M73, which are supplied by a technical process TP which is to be controlled and/or to be monitored, are entered, the interval between the respective calls of the operating tasks is also a variable parameter of the control algorithm which describes the respective sampling time.

In order to determine the varying sampling times, it is possible to determine a parameter as a measure of the current status of the system clock time.

If this parameter is temporarily stored within the operating task 71, 72, 73, then the current sampling time can be transmitted when the operating task 71, 72, 73 is next called, using the difference between this temporarily stored value and the newly transferred parameter.

It is also possible for the operating task 71, 72, 73 to be supplemented by statements which are used to determine the current state of the system clock time. The currently determined time in each case is also temporarily stored within the operating task in this case, so that this temporarily stored value can be used to determine the time difference when the operating tasks 71, 72, 73 are next called.

A great deal of effort (in terms of computation time) is frequently involved, however, in determining a time difference from two pieces of time information indicating, for example, the time of day in hours, minutes and seconds. For this purpose, the two times of day could be converted into seconds, for example, but this would require various multiplication and addition operations. This takes up computation time which can be better placed at the disposal of the respective applications, for example the user-adaptable task 61, 62 or the operating tasks 71, 72, 73.

It is therefore advantageous, for example, for the present invention to provide a time index register T51 whose contents represent a piece of time information.

For this purpose, an advantageous embodiment of the present invention provides for the central task 5 to call a time index task 51 at equidistant intervals, the time index task 51 incrementing the contents of a time index register T51 with each call. The contents of the time index register T51 can be determined for the operating task 71, 72, 73 and can thus be used for determining the respective sampling time.

For example, when a call is made, the operating task 72 determines the contents of the time index register T51 and stores the value. When the operating task 72 is next called, the operating task 72 determines the contents of the time index register T51 again and can use the difference between the current contents of the time index register T51 and the stored value, which represents the contents of the time index register T51 when the operating task 72 was last called, to determine a measure of the time period between the two successive calls, and consequently can therefore determine the sampling time.

Figure 5:
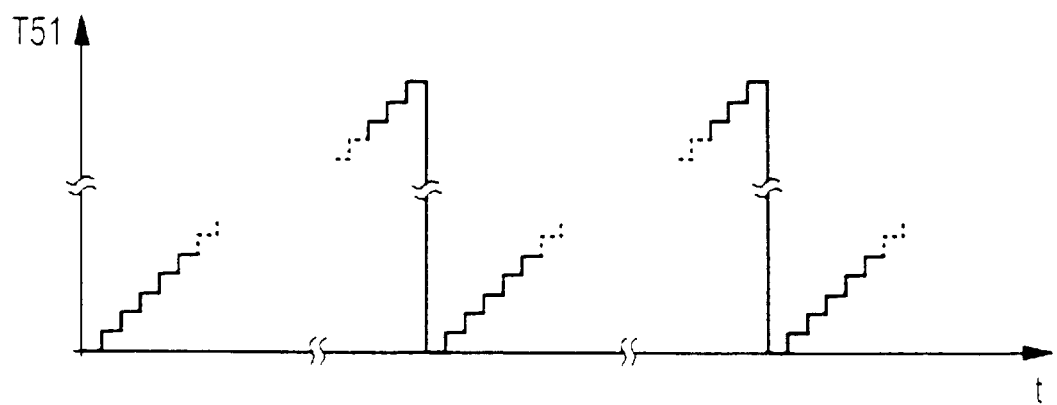
FIG. 5 shows an operating profile.
Figure 6:
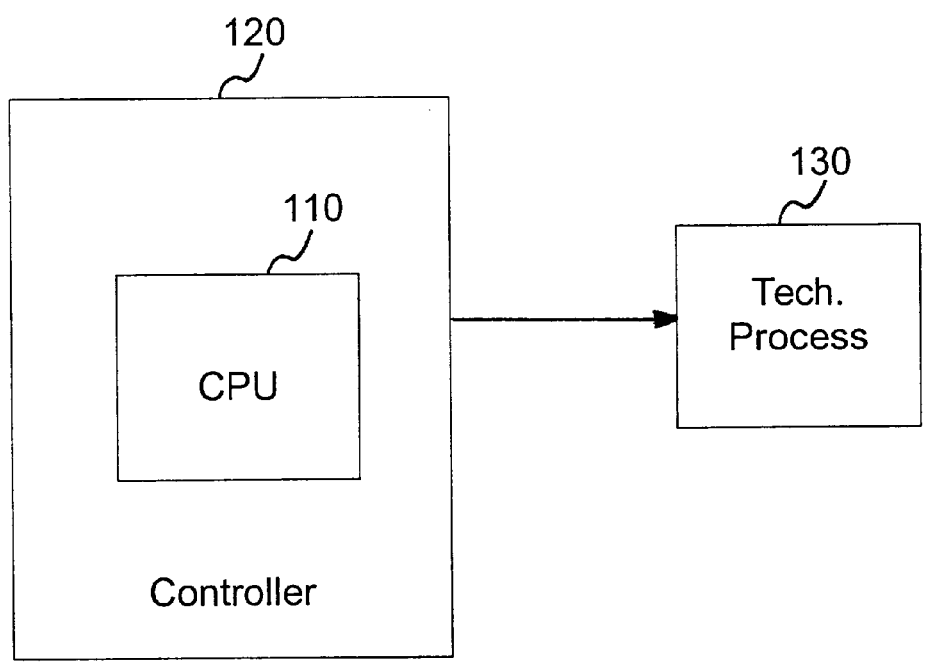
FIG. 6 is a block diagram of a programmable controller.

If the time index register T51 is a 16-bit-long register, for example, the largest value which can be stored in the time index register is 65,535. If this maximum possible value is already stored in the time index register T51, then incrementing the contents of the time index register T51 again leads to a so-called register overflow. This means that the contents of the time index register T51 are reset to the value zero. Starting from this value zero, the contents of the time index register T51 can be incremented again with subsequent calls of the time index task 51 until the next register overflow. Plotted against time, this produces a sawtooth function for the contents of the time index register T51, as shown in FIG. 5.

If a register overflow of the time index register T51 has still not occurred during two successive calls to an operating task 71, 72, 73, the contents of the time index register are greater for the current call of the respective operating task 71, 72, 73 than for the previous call in each case. The measure of the time difference is consequently calculated simply by subtracting, from the contents of the time index register T51 at the current call instant, the value which is temporarily stored in each case in the operating task 71, 72, 73 and represents the contents of the time index register T51 at the preceding call instant.

On the other hand, if the time index register T51 overflows between two successive calls to an operating task 71, 72, 73, then the value of the time index register T51 at the current call instant is less than the contents of the time index register T51 at the preceding call instant. Before determination of the sampling time in the respective operating task 71, 72, 73, a check is therefore carried out to determine whether this arrangement exists, i.e. whether the contents of the time index register T51 are less at the current call instant than the temporarily stored value. If this is the case, then the largest value which can be stored in the time index register T51, i.e., 65,535 in this case, is added to the current contents of the time index register T51. This is shown in the graphical illustration according to FIG. 5 by the fact that two triangles of the sawtooth are simply shifted in such a way as to produce a linear, uninterrupted gradient. If the contents of the time index register T51 are corrected in this way, the sampling time can be determined in a known manner by subtraction.

Finally, the present invention can be described briefly as follows:

Whenever operating tasks, by means of which control functions are implemented, for example, are no longer called by a central task, that is to say the scheduler of a real-time operating system, for example, but instead are called by the respective user-adaptable tasks, in which the measured values supplied by the operating tasks are processed, the software producer is relieved of complex organizational work of software for production. Since the sampling time of, for example, a control algorithm is no longer constant for the resultant calls (which are not equidistant) to the operating tasks, the currently valid sampling time has to be transferred as a parameter to the respective algorithms of the operating tasks. However, the sampling time can be determined in a particularly simple manner if the operating tasks determine a time value with each call and themselves determine the sampling time from the difference between the current and the preceding time value. In turn, it is possible to determine a time value in a particularly simple manner if a time index register is polled for this purpose and is incremented with each call by a time index task which is called periodically by the central task.

What is claimed is:

1. A programmable controller for controlling and/or monitoring a technical process, comprising:

a user-adaptable task; and an operating task, the user-adaptable task calling the operating task, the operating task receiving at least one measured value from the technical process and determining a piece of data, referring to a measured value, as a function of one of a mathematical function and a logic function, the one of the mathematical function and the logic function being defined by a parameter, the piece of data being determined when the operating task is called, the operating task determining a time of a current call of the operating task, the programmable controller determining a time difference between the time of the current call of the operating task and a time of a preceding call of the operating task, the time difference being the parameter.

2. The programmable controller according to claim 1, wherein the programmable controller includes a central processing unit for executing the user-adaptable task and the operating task.

3. The programmable controller according to claim 1, wherein the operating task determines the time difference.

4. The programmable controller according to claim 1, further comprising:

a central task controlling performance of the user-adaptable task.

5. The programmable controller according to claim 4, further comprising:

a time index task called by the central task, the time index task being called by the central task and incrementing contents of a time index register with each call of the time index task.

6. The programmable controller according to claim 5, wherein the central task calls the time index task in a specifiable, equidistant time frame.

7. The programmable controller according to claim 5, wherein the operating task determines the time of the current call of the operating task as a function of contents of the time index register.

8. A method for calling an operating task in a programmable controller, the programmable controller controlling and/or monitoring a technical process, comprising:

calling an operating task by a user-adaptable task;

receiving, by the operating task, a measured value from the technical process;

determining, by the operating task, a piece of data, referring to the measured value, as a function of one of a mathematical function and a logic function, the one of the mathematical function and the logic function being defined by a parameter, the piece of data being determined when the operating task is called;

determining, by the operating task, a time of a current call of the operating task; and determining a time difference between the current call of the operating task and a preceding call of the operating task, the time difference being the parameter.

9. The method according to claim 8, wherein the determining the time difference step is performed by the operating task.

10. The method according to claim 8, further comprising:

controlling, by a central task, a performance of the user-adaptable task.

11. The method according to claim 10, further comprising:

calling, by the central task, a time index task, the time index task incrementing contents of a time index register with each call.

12. The method according to claim 11, wherein the calling the time index task step includes calling the time index task in a specifiable, equidistant time frame.

13. The method according to claim 11, wherein the determining the time of the current call of the operating task step includes determining the time of the current call of the operating task as a function of the contents of the time index register.

* * * * *